United States Patent

[11] 3,623,813

[72] Inventor Dionys Hacman
 Trubbach, Switzerland
[21] Appl. No. 784,721
[22] Filed Dec. 18, 1968
[45] Patented Nov. 30, 1971
[73] Assignee Balzers Patent-Und Beteiligungs AG
 Furstentum, Liechtenstein
[32] Priority Dec. 21, 1967
[33] Switzerland
[31] 18037/67

[54] METHOD FOR MONITORING TEMPERATURE VARIATIONS OF RADIATION-PERMEABLE SUBSTRATES FOR SUPPORTING THIN COATINGS APPLIED BY VACUUM DEPOSITION
1 Claim, 3 Drawing Figs.

[52] U.S. Cl.................................................... 356/108,
 73/344, 356/161
[51] Int. Cl..................................................... G01b 9/02
[50] Field of Search........................................ 356/4, 5,
 141, 152, 1, 108, 161, 202, 107; 73/344

[56] References Cited
 UNITED STATES PATENTS
3,040,583 6/1962 Post............................. 356/108

3,409,370 11/1968 King et al..................... 356/107
 OTHER REFERENCES

Papp, " Control of the Thickness of Evaporated Layers During Evaporation"; 10–1959, The Review of Scientific Instruments, Vol. 30, No. 10, pp. 911, 912.

Boss et al., " Simultaneous in Situ Measurements of Film Thickness and Substrate Temperature"; 3–1967, IBM Tech. Disclosure Bulletin, Vol. 9, No. 10, pp. 1389, 1390.

Primary Examiner—Rodney D. Bennett, Jr.
Assistant Examiner—Stephen Buczinski
Attorney—McGlew and Toren ABSTRACT: The temperature variations of radiation-permeable substrates, for supporting thin coatings applied by vacuum deposition, are monitored by illuminating the substrate with light having a sufficient length of coherence, such as light form a LASER or a MASER. The light rays reflected from two boundary surfaces of the substrate are combined on a receiving surface and brought into interference. The distribution of light intensity on the receiving surface, and the variations with respect to time of the light intensity, determine the thermal expansion of the substrate and thus its temperature. As light is also reflected from the surface of the coating, it is possible to monitor the thickness of the coating being applied.

PATENTED NOV 30 1971 3,623,813

INVENTOR.
DIONYS HACMAN by
McGlew & Toren
ATTORNEYS

METHOD FOR MONITORING TEMPERATURE VARIATIONS OF RADIATION-PERMEABLE SUBSTRATES FOR SUPPORTING THIN COATINGS APPLIED BY VACUUM DEPOSITION

BACKGROUND OF THE INVENTION

In the technique of providing carrier supports or substrates with thin coats, whether the coating is effected by vacuum evaporation or deposition or by any other method, the correct setting and constant monitoring of the carrier or substrate temperature is of great importance. The procedures used hitherto for temperature measurements, for example, by means of thermocouples or bolometers, generally disturb the thermal equilibrium, or else they are not applicable because the measurement is completely masked by other distributing procedures occurring at the same time.

This is particularly true with respect to known methods based on the measurement of the radiation emitted by a heated body. For the relatively low temperatures of up to about 400° C., most frequently used for coating radiation-permeable substrates, such as glass plates, the known radiation measuring procedures are hardly applicable because the emission power of radiation-permeable bodies is low and they do not emit at these low temperatures a sufficiently intensive radiation for measurement compared to the unavoidable disturbance sources, such as evaporators for example, heated to 1,000° C. or more.

SUMMARY OF THE INVENTION

This invention relates to the monitoring of the temperature of radiation-permeable substrates for supporting thin coatings applied by vacuum deposition or the like and, more particularly, to a novel method and apparatus for such monitoring capable of determining the temperature of the substrate with great accuracy and without disturbing the temperature equilibrium, and providing constant supervision of the temperature during application of the coatings.

In accordance with the invention, the substrate to be monitored is illuminated with light capable of interference, and the light increments reflected by two boundary surfaces of the substrate are combined on a receiving surface and brought to interference. The distribution of light intensity on the receiving surface and the variations in the light intensity with respect to time are utilized to determine the thermal expansion of the substrate being monitored and thus to determine its temperature.

The invention thus solves, in a surprisingly simple manner, the problems encountered in vacuum deposition of coatings with respect to monitoring the temperature of the supports or substrates being coated. No precision optical parts need be installed in the coating apparatus in order to implement the invention, and no special temperature sensors need be provided on the substrates or supports to be monitored. Furthermore, the invention provides for constant observation, simultaneously with the measurement of the variable temperature of the support or substrate and of the thickness variation during application of the coating; that is, it provides for constant observation of the growth rate of the coating, which is likewise very important for the production of such coatings.

An object of the invention is to provide an improved method for monitoring temperature variations of radiation-permeable substrates.

Another object of the invention is to provide such a method for monitoring temperature variations of radiation-permeable substrates for supporting thin coatings applied by vacuum deposition.

A further object of the invention is to provide such a method which also is effective in monitoring the thickness or growth rate of the coatings.

Another object of the invention is to provide apparatus for monitoring temperature variations of radiation-permeable substrates.

A further object of the invention is to provide an apparatus for monitoring temperature variations of radiation-permeable substrates for supporting thin coatings applied by vacuum deposition.

For an understanding of the principles of the invention, reference is made to the following description of typical embodiments thereof as illustrated in the accompanying drawings.

DESCRIPTION OF THE PREFERRED EMBODIMENTS

Figure 2:
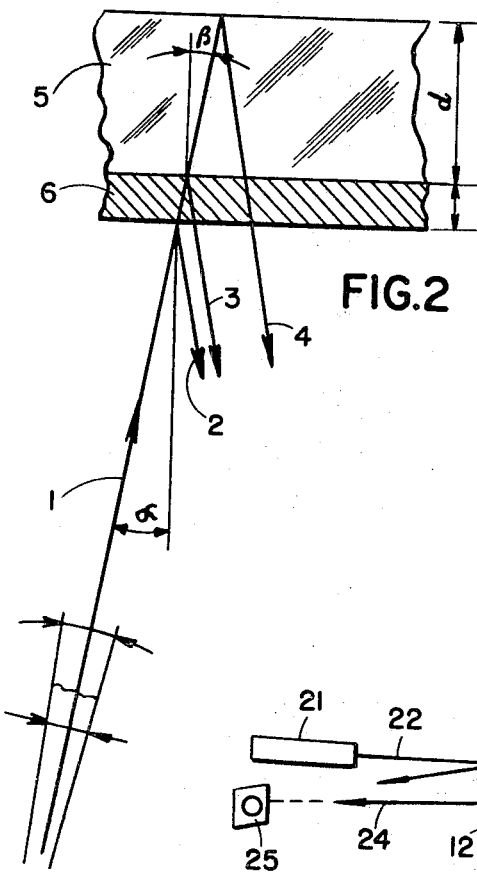
FIG. 2 is a somewhat diagrammatic illustration of the path of light rays in a coated substrate.

In order to facilitate an understanding of the invention, the well-known basic facts of the interference of light will be illustrated by the example of a plane-parallel coated plate. Referring to FIG. 2, the light ray 1 falling on a plate 5 having a coating 6 is partly reflected at each boundary surface. In the case where the reflecting surfaces are parallel, there are three reflected rays, namely rays 2, 3 and 4.

The reflected ray 3 appears due to the difference between the index of refraction of plate 5 and that of coating 6. However, it should be understood that the coating thicknesses usually found in the thin-coating technique are not represented true to scale in the drawing in the order of the wavelength of visible light, since these coatings are much thinner than the glass plates, lenses, or other bodies generally used as supports or substrates whose thickness dimensions are of the order of millimeters.

If the illuminating light is capable of interference, that is, if it has a sufficient coherence length, the reflected light waves can be brought to interference on a receiving surface with a system of interference bands being formed on the latter. This system is determined by the differences between the optical paths lengths of the interfering wave trains and their amplitude. If these optical path lengths change, due to thermal expansion or variation of the thickness of the growing coating, the interference bands move beyond the receiving surface and there is obtained a periodic change between maximum and minimum intensity. The change from a minimum to a maximum of the intensity corresponds to a difference $\lambda/2$ between the optical path lengths of two interfering rays.

Considering first only the path length difference $\Delta s$ between the rays 3 and 4 which are reflected by the two boundary surfaces of carrier plate 5, this path length difference is determined by the longer path of ray 4 through the plate 5 as follows: $\Delta s = 2d/\cos \beta$. With a given angle $\beta$ of ray 4 inside plate 5, the path length difference is thus proportional to the thickness $d$ of the plate, and this thickness varies with temperature.

Assuming, for example, a plate of so-called machine glass, similar to type BK7 with an index of refraction $n=1.515$ (for a wavelength of 6,328 A. (angstrom units)) and with a coefficient of linear expansion $\alpha=8.2 \cdot 10^{-6}$, whereby the plate thickness $d$ is selected to be 1 mm., there is obtained: $\Delta d = d \cdot \alpha \cdot \Delta T$ $\Delta d/\Delta T = d \cdot \alpha = 82$ A./°C. The corresponding variation of the optical thickness $(d \cdot n)$ is obtained as follows: $\Delta dn/dT = 121$ A./°C.

A variation of the optical thickness of $(\lambda/4) = 6,328$ A./4 = 1,582 A. (if the wavelength $\lambda = 6,328$ A. is used) would thus be caused by a temperature variation of $1,582/121 =$ about 13°

C. That is, during heating or cooling of such a plate, there is observed, after each temperature interval of 13° C., a reversal point of the intensity or, with direct visual observation, a displacement of the interference pattern by 1 bandwidth. Since it is easy to measure a fraction, for example, 0.1 ($\lambda/4$), it is thus possible to measure, and to supervise constantly, in this simple way a heating or cooling of the transparent coated support before, during, or after a coating operation, with an accuracy of at least 1° C.

Figure 1:
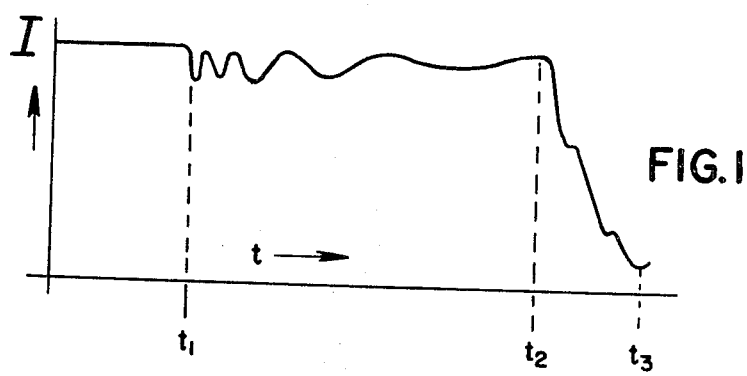
FIG. 1 is a graphic illustration of the chronological variation of the intensity of the interfering light incident on a photosensitive detector and reflected by two boundary surfaces of a substrate, as monitored in accordance with the method of the invention.

An example is illustrated in FIG. 1. At the time $t_1$, heating of a test glass plate, arranged in an evaporation apparatus, was initiated. The intensity of the reflected light, which had previously been constant, shows variations during the heating, and passes through five minima and maxima in the time interval $t_1$ to $t_2$. This corresponds to an optical thickness variation of the plate by 25 A. units and, in the above-mentioned example, to a temperature variation of 130° C. From the course of the curve, the rate of the temperature increase also can be determined and controlled. This rate is initially rapid, but then approaches slowly the equilibrium temperature prevailing at the time $t_2$.

In the example of FIG. 1, the application of a thin coating, by evaporation, was initiated at the $t_2$. The curve show that a coating of $\lambda/4$ optical thickness was applied in the time from $t_2$ to $t_3$, which results in a low minimum at the time $t_3$. As the coat continues to grow, the curve rises again and would attain a high maximum at an optical thickness of $\lambda/2$, a minimum at $\frac{3}{4}\lambda$, etc. From the course of the curve between $t_2$ and $t_3$, it can also be seen that, due to the radiation of the evaporation source, a further temperature increase occurs in the plate, and this results in a thickness variation of $5\lambda/4$, corresponding to a temperature variation of 65° C.

Figure 3:
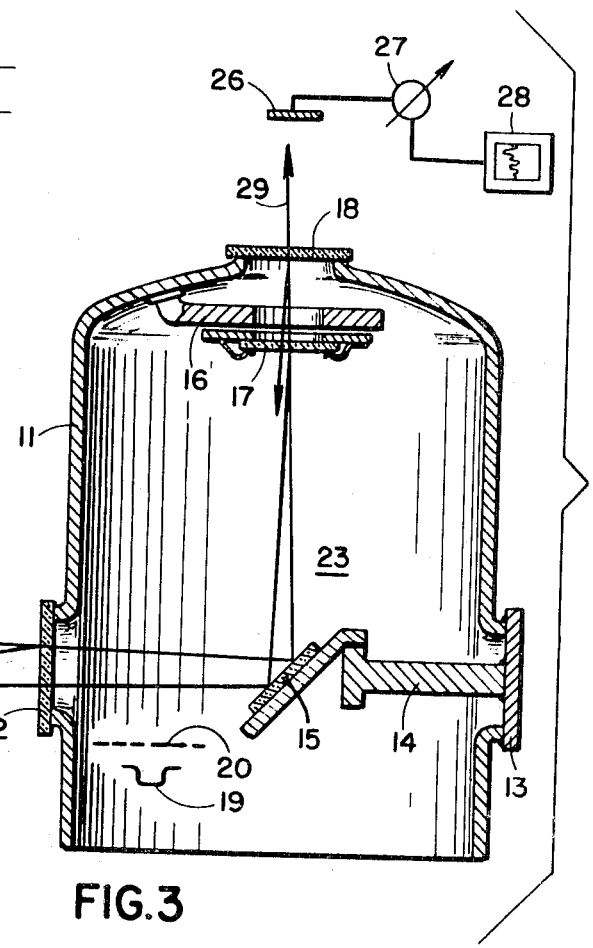
FIG. 3 is a part schematic and part sectional view of a vacuum deposition plant for producing the coating, illustrating schematically the arrangement of a light source and a photosensitive detector for performing the method of the invention.

FIG. 3 illustrates a simple apparatus suitable for performing the method of the invention. The receiving bell of a vacuum evaporation apparatus is indicated at 11, and has a radiation-permeable window 12, a retaining flange 13 with a bar 14 for holding a reflecting mirror 15, an additional heatable holder 16 for the glass plate 17 to be coated by evaporation, and an observation window 18. In the evaporation apparatus, there is arranged an evaporation source 19 and a vapor diaphragm or screen 20. Evacuating devices, and other accessories, of an evaporation apparatus are not indicated in FIG. 3 because they are not essential for an understanding of the invention.

A source 21, of light which is coherent in time and space, is provided for performing the invention method, and a ray 22 from this source enters through window 12 into the vacuum chamber 23. This ray 12 is deflected by reflecting mirror 15 to glass plate 17 to be monitored, and whose boundary surfaces partly reflect the light, as was explained with reference to FIG. 2. All of the reflected light rays are represented, in FIG. 3, by a single ray 24. The reflected rays impinge on the receiving surface 25 of a photosensitive detector, and with an intensity which is determined by the above-described interference effects at each moment.

Instead of working with reflected light, transmitted light also can be used. To this end, an additional photosensitive detector 26 can be operatively associated with a measuring instrument 27 and possibly a recording device 28 for recording the intensity curve of the transmitted light 29 permeating through observation window 18. By the term "light," as used in the present invention, is understood not only visible light but also ultraviolet light and infrared light.

As a source of light which is coherent in time and space, there is preferably used an optical molecular oscillator (so-called LASER). However, the rays of the incident measuring light need not be strictly parallel, and divergent measuring light beams can be used to a minor extent. This is represented schematically in FIG. 2 by the indications of the boundaries of the beams. Also, it is not necessary that the carrier supports or substrates to be monitored should be bounded by plane-parallel surfaces.

It is advisable to design the apparatus for performing the invention method so that the angle $\alpha$ of the incident ray (22, $\lambda$) of the coherent light can be made variable. This provides for the above-mentioned possibility for simultaneous temperature and coat thickness measurements, since readily distinguishable amplitudes of different size are obtained by the intensity variations of the interfering light appearing on the receiving surface of the photosensitive detector upon selection of a corresponding angle of incidence of the measuring light ray during application of the coating. This is due to the temperature variations of the support or substrate, on the one hand, and the growth of the coating, on the other hand, as can be seen from the intensity curve of FIG. 1 between the times $t_2$ and $t_3$.

The different amplitudes are due to the fact that the optical path length of ray 3, passing only through the coating, is influenced only to a minor extent by a variation of the angle of incidence, while the optical path length of ray 4 is influenced to a much greater extent by the same variation of the angle of incidence. With an exactly perpendicular incidence of the measuring light ray, the intensity fluctuations caused by the temperature variations could not be distinguished from the intensity fluctuations of the interfering light caused by the growing coating.

What is claimed is:

1. A method for monitoring temperature variations of radiation-permeable substrates, for supporting thin coatings applied by vacuum deposition, said method comprising the steps of illuminating the substrate to be monitored with light capable of interference, combining, on a receiving surface, the light increments reflected by two boundary surfaces of the monitored substrate and bringing the increments into interference on the receiving surface; utilizing the distribution of light intensity on the receiving surface, and the variations with respect to time of such light intensity, to determine the thermal expansion of the substrate to be monitored and thus its temperature; during monitoring of the temperature variations, applying a thin coating by vacuum deposition to a surface of the substrate; utilizing a variable angle of incidence of the light illuminating the substrate; bringing the reflected light to interference on the receiving surface of a photosensitive detector; and suitably selecting the variable angle of incidence of the light illuminating the substrate and the growing coating thereon to be monitored, to obtain readily distinguishable amplitude fluctuations, responsive to the differing magnitude of the intensity fluctuations of the interfering light appearing on the receiving surface of the photosensitive detector during vacuum deposition of the coating on the surface of the substrate; the intensity fluctuations of the interfering light on the receiving surface of the photosensitive detector varying, on the one hand, due to the variation in temperature of the substrate and, on the other hand, due to the growth of the coating.

* * * * *